Oct. 14, 1952  E. A. EBERT  2,613,472
AERATED BAIT CONTAINER
Filed June 29, 1948  2 SHEETS—SHEET 1
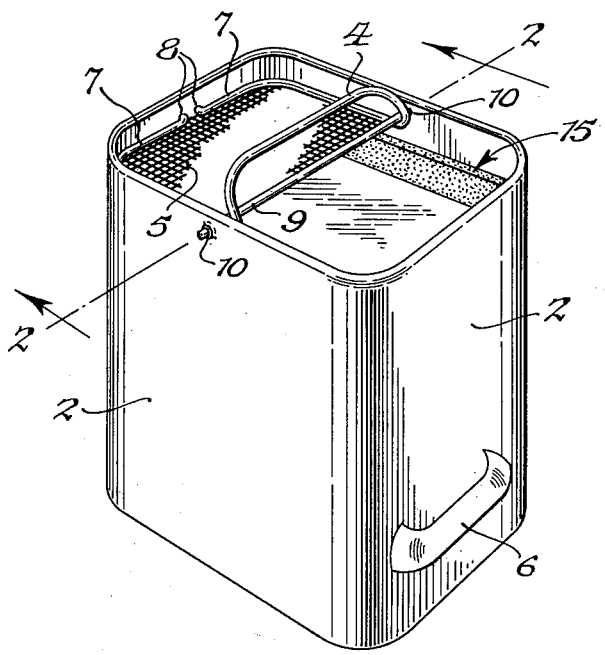
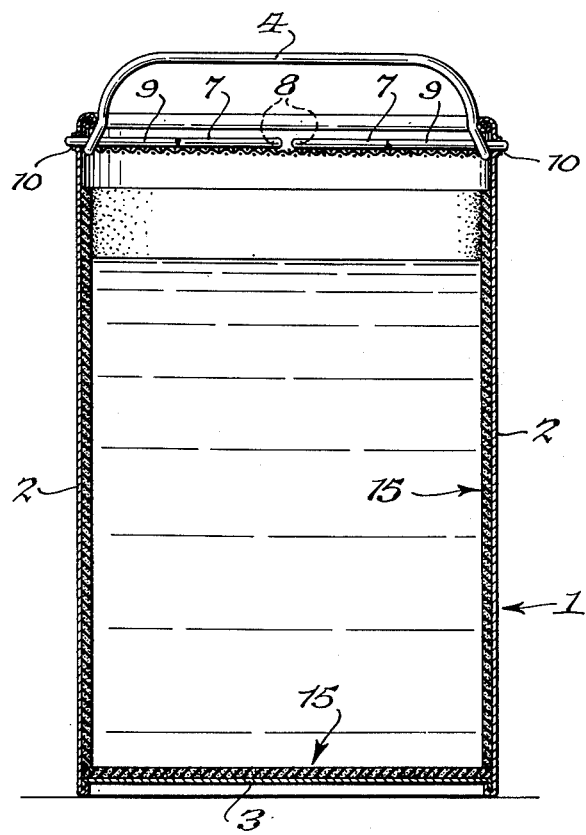
INVENTOR
Edward A. Ebert

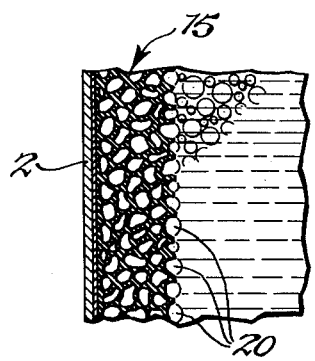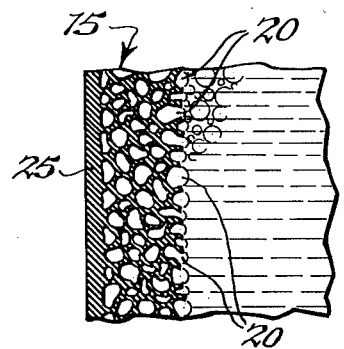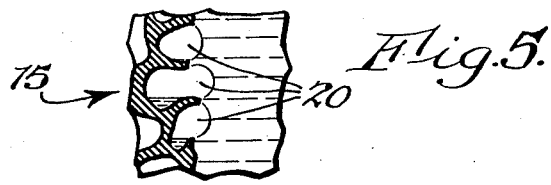

Patented Oct. 14, 1952

2,613,472

UNITED STATES PATENT OFFICE 2,613,472

AERATED BAIT CONTAINER

Edward A. Ebert, Snyder, N. Y.

Application June 29, 1948, Serial No. 35,812

1 Claim. (Cl. 43—56)

This invention relates to means for effecting intimate contact between air and water to facilitate absorption of the air by the water. More particularly the invention relates to the maintenance of a maximum amount of air in suspension or solution in the water of a container used for storing live bait, such as minnows, so that such bait will remain active and fit until used.

An object is to provide a bucket for live bait, such as minnows, which will continuously replenish oxygen withdrawn from the water by the bait, over a prolonged period, with a minimum of personal attention; which will maintain intimate surface contact between oxygen or air and the water of the bucket over a maximum area; with which danger of injury to the bait will be reduced to a minimum; with which the space desired for the bait will be a maximum for any size bucket; which requires a minimum of change in existing designs of bait buckets; which will have long life, and which will be relatively simple, efficient and inexpensive.

Another object is to provide this aeration without the use of outside power to supply air to the water, even under static conditions.

A further object is to apply aeration in such a way that the water will absorb the air more readily and more quickly than by ordinary means, such as by keeping the water at a more favorable temperature, and by keeping the air under pressure, in contact with the water.

Another object is to provide a construction which recharges its air when the normal act of changing the water occurs.

A still further object is to surround the water in the bucket with air at the sides and bottom with the largest exposed area of said air possible, by providing aerating at the sides and bottom of the bucket.

Other objects, advantages and capabilities of the invention will appear from the following description of several embodiments thereof.

In the accompanying drawings:

Fig. 1 is a perspective view of a minnow bucket constructed in accordance with the invention.

Fig. 2 is a vertical section thereof taken approximately along the line 2—2, Fig. 1.

Fig. 3 is a fragmentary section, greatly enlarged, showing an aerator liner cemented to the wall of the bucket.

Fig. 4 is a fragmentary section similar to Fig. 3, showing the inside wall of the bucket having an aerator surface integral therewith.

Fig. 5 is a fragmentary view very greatly enlarged to show the formation of the air bubbles trapped in the aerator surface.

In the embodiment of the invention shown in Fig. 1, 2 and 3, a container 1 is provided of substantially rectangular form, the side walls of which are connected by rounded corners. This shape lends more readily to packing where space is at a premium, and also provides a greater volume of water, although a container of any other shape or form may be used, if desired.

The container 1 has side walls 2 and a bottom wall 3. A combined bail handle 4 and screen 5 may be detachably mounted in one-half of the mouth of the container. The other half of the container mouth may be closed by a hinged screen or other means (not shown), if desired. Near the bottom of the end wall, opposite the screened mouth, is provided another handle 6 to facilitate the handling of the bucket when changing the water and air. To do this, one hand grasps the bail handle 4 and the other hand grasps the handle 6. The bucket is then tilted to pour water out through the screened end 5, thus retaining the bait in the bucket. To fill, the bucket may be dipped into water and water enters the bucket back through the screen 5, thereby filling the bucket to whatever level is desired.

The wires 7 of the bail 4 follow the contour of the bucket, and the ends of the bail are inserted into holes 8 in one end wall of the bucket 1. A cross bar 9 is welded or otherwise secured to the bail 4 and enters holes 10 in the side walls of the bucket 1. The screen 5 is soldered to the wires 7 and the cross bar 9. All that it is necessary to do in order to remove the bail and screen from the bucket or container 1 is to spring the side walls 2 outwardly beyond the ends of the cross bar 9 and then withdraw the ends 7 from the holes 8.

The side walls 2 and the bottom 3 have cemented thereto an aerator 15, comprising a material which has a large number of small cavities or pockets in its surface. I have found that a plastic material such as sponge rubber, either natural or synthetic, has such a surface. When manufactured, sheets of this material have a skin or closed surface on both of its sides. A sheet of such material is then split or cut into one or more veneers of the desired thickness, thus cutting through the myriads of gas pockets which characterize this material. It is these cavities on the water side of the aerator 15 which are used to retain air for aeration of the water in the bucket.

To the trade "sponge rubber" denotes a rubber having non-interconnecting pockets, while "foam rubber" has interconnecting pockets permitting this material to breathe, i. e. pass air from one cell to another. Either sponge or foam rubber can be used for my aerator, as well as cellulose sponge, sponge made of rubber-like plastics, nap fabrics or other materials capable of entrapping small air bubbles.

It will be observed in Figs. 3 and 5 that cavities or pockets 20 of the aerator wall 15 do not fill with water but hold the air under the water. This is caused by the surface tension of the water bridging the entrance to the cavity, thereby preventing the air from leaking out or escaping. In my experiments I have found that these air pockets have actual bubbles bulging outwardly into the water giving them much greater area exposed to the water than if they were flat.

To use the bucket, water is either poured or dipped into the bucket. The air is retained in the pockets 20. It makes no difference whether the bucket has been proviusly used and is wet, or if it is dry.

To replenish the air or water supply, it is merely necessary to pour the water out and refill the container 1. As the water is poured out, the air supply in the pockets or cavities 20 is also replenished by contact with air that enters the bucket to replace the water.

The aerating area in a bucket of this type is always equal and possibly greater than the actual inside area of the container 1 up to the level of the water. The more water that is used, the greater the surface aerating area, since the aerator 15 is made higher than the level of the water ordinarily used in the bucket.

A thicker aerator 15 is used than necessary for aeration for the purpose of insulating the water from the walls 2 and 3 of the container 1, because it is a known fact that the live bait cannot live when the water gets too warm. The water used is almost always lower in temperature than the air temperature and the insulation effect obtained by the closed air space 15 effectively keeps the water cooler for longer periods of time.

In Fig. 4 is illustrated by way of example a bucket wall 2 made with an integral solid portion 25 rigid enough to be self-supporting, and the whole container 1 would be made of this material.

It will be understood that various changes in the details, materials and arrangements of parts which have been herein described and illustrated in order to explain the nature of the invention, may be made by those skilled in the art within the principle and scope of the invention as expressed in the appended claim.

I claim:

A bait bucket, comprising a container having connected side and bottom walls, the greater part of which are composed of a plastic having a myriad of internal, rounding, closely spaced, small cells, the cells in the outer part of said walls being out of communication with the exterior of said bucket and out of communication with each other to provide a dead gas cellular thermal insulation, and the cells in the inner part of said walls having mouths opening to the interior of the bucket to provide a myriad of pockets lining the interior of said bucket and each containing an individual body of air.

EDWARD A. EBERT.

REFERENCES CITED

The following references are of record in the file of this patent:

UNITED STATES PATENTS

| Number | Name | Date |
|---|---|---|
| 661,093 | Warren | Nov. 6, 1900 |
| 1,843,563 | Knoernschild | Feb. 2, 1932 |
| 1,897,571 | Camporini | Feb. 14, 1933 |
| 1,934,138 | Paul et al. | Nov. 7, 1933 |
| 1,970,011 | Ludlow | Aug. 14, 1934 |